United States Patent [19]
Cargille

[11] Patent Number: 6,164,134
[45] Date of Patent: Dec. 26, 2000

[54] BALANCED VIBRATORY GYROSCOPE AND AMPLITUDE CONTROL FOR SAME

[75] Inventor: Donald R. Cargille, Culver City, Calif.

[73] Assignee: Hughes Electronics Corporation, El Segundo, Calif.

[21] Appl. No.: 09/239,632

[22] Filed: Jan. 29, 1999

[51] Int. Cl.[7] .................................................. G01C 19/00
[52] U.S. Cl. .......................................................... 73/504.02
[58] Field of Search ........................... 73/504.02, 504.03, 73/504.04, 504.12, 504.15

[56] References Cited

U.S. PATENT DOCUMENTS 5,894,090  4/1999  Tang ...................................... 73/504.02

Primary Examiner—Richard A. Moller
Attorney, Agent, or Firm—Terje Gudmestad

[57] ABSTRACT

A balanced vibratory micro-gyroscope having an electrode pattern having four inner drive electrodes and four outer sense electrodes for providing balanced push-pull control of a cloverleaf micro-gyroscope. A control circuit utilizes equal and opposite input signals to the drive electrodes and processes output signals from the sense electrodes to precisely control the drive electrodes. Capacitance is added between opposing drive and sense electrodes pattern in order to null capacitive coupling effects between adjacent drive and sense electrodes. The control circuit linearizes the force on the micro-gyroscope thereby improving performance. Advantage is taken of Coulomb's Law to eliminate an electronic multiplier in the vibration amplitude control loop. A simplified full-wave rectifier further enhances the control circuit and operation of the micro-gyroscope. A closed negative feedback loop in the control circuit provides a corrective signal to the rate driving electrodes through rate sensing signals in order to prevent unwanted harmonic movement in the micro-gyroscope.

17 Claims, 4 Drawing Sheets

BALANCED VIBRATORY GYROSCOPE AND AMPLITUDE CONTROL FOR SAME

TECHNICAL FIELD

The present invention relates to micro-machined electro-mechanical systems (MEMS), and more particularly, to a MEMS vibratory gyroscope, or a micro-gyroscope, and amplitude control for the same.

BACKGROUND ART

Micro-gyroscopes are used in many applications including, but not limited to, communications, control and navigation systems for both space and land applications. These highly specialized applications need high performance and cost effective micro-gyroscopes.

There is known in the art a micro-machined electromechanical vibratory gyroscope designed for micro-spacecraft applications. The gyroscope is explained and described in a technical paper entitled "Silicon Bulk Micro-machined Vibratory Gyroscope" presented in June, 1996 at the Solid State Sensor and Actuator Workshop in Hilton Head, S.C.

The prior art gyroscope has a resonator having a "cloverleaf" structure consisting of a rim, four silicon leaves, and four soft supports, or cantilevers, made from a single crystal silicon. The four supports provide mechanical support and restoring force for the harmonic motion of the structure. A metal baton is rigidly attached to the center of the resonator, in a plane perpendicular to the plane of the silicon leaves, and to a quartz base plate spaced apart from the silicon leaves. The quartz base plate has a pattern of electrodes that coincides with the cloverleaf pattern of the silicon leaves. The electrodes include two drive electrodes and two sense electrodes.

The micro-gyroscope is electrostatically actuated and the sense electrodes detect Coriolis induced motions of the silicon leaves capacitively. The micro-gyroscope has a low resonant frequency due to the large mass of the metal post and the soft cantilevers. The response of the gyroscope is inversely proportional to the resonant frequency. Therefore, a low resonant frequency increases the responsivity of the device.

The leaves provide large areas for electrostatic driving and capacitive sensing. Applying an AC voltage to capacitors that are associated with the drive electrodes excites the resonator. This excites the rotation $\Theta_x$ about the drive axis and rocking-like displacement $\Theta_y$ for the leaves.

Because the post is rigidly attached to the leaves, the rocking movement of the leaves translates to movement of the baton. When the leaves oscillate in the drive mode, the displacement of the post is near parallel to the leaf surface in the y-direction. When a rotation rate is applied about the z-axis, Coriolis force acts on the oscillating post and causes its displacement in the x-direction. The baton displacement is translated back into the rocking motion, $\Theta_y$, of the leaves. The baton provides a large Coriolis coupling that transfers energy between the two orthogonal rocking modes.

The control electronics associated with the micro-gyroscope include an actuation circuit that is essentially an oscillator around the micro-gyroscope that locks onto the drive resonance mode. The signals from the sense electrodes are summed to remove the differential signal between them and the response of the sense resonance from the feedback loop. On the other hand, the sense circuit subtracts the signals from the sense electrodes to remove the common-mode drive signal.

The drive circuit includes an Automatic Gain Control (AGC) function to maintain a constant vibration amplitude and velocity for the micro-gyroscope. The AGC function requires a multiplier which in the prior art is accomplished using either expensive, analog integrated circuits that are not suitable for the harsh environment in space, or inexpensive Field Effect Transistors (FET's) operating in the triode region, also known as the variable resistance mode. While, FET's are capable of withstanding the harsh space environment, they are not uniform and have transistor to transistor variations that cause problems in the AGC loop. In addition, the integrated circuits and the FET's are subject to drift due to temperature and radiation exposure.

Another problem associated with prior art micro-gyroscopes is the potential for electrical interference that degrades gyroscope performance with regard to drift and scale factor stability. Micro-gyroscopes often operate the drive and sense signals at the same frequency to allow for simple electronic circuits. However, the use of a common frequency for both functions allows the relatively powerful drive signal to inadvertently electrically couple to the relatively weak sense signal. This is a disadvantage of having the benefit of simplified electronic circuit control. An alternative is to use a different frequency to carry the sense signal. However, this introduces a significant increase in the mechanical and electrical complexity of the circuit.

Noise and drift in the electronic circuit limit micro-gyroscope performance. Therefore, prior art micro-gyroscopes perform poorly and are unreliable in sensitive space applications.

SUMMARY OF THE INVENTION

The present invention is a simplified electronic circuit for controlling a micro-gyroscope that avoids electrical interference and provides optimum performance of the micro-gyroscope. The present invention is a MEMS micro-gyroscope that has a unique electrode arrangement that differs significantly from the cloverleaf pattern of the micro-gyroscope resonator. The MEMS micro-gyroscope of the present invention has a control circuit with a simple circuit design to avoid the problems associated with prior art gyroscopes. The present invention shares the same frequency for the drive and sense functions yet avoids unwanted electrical coupling and interference by introducing capacitive coupling.

The present invention includes an electrode pattern of eight individual electrodes that mechanically and electrically separate the drive axis from the sense axis. The control circuit has a wide-band negative feedback loop around the output axis of the micro-gyroscope that is closed to provide torque rebalancing of the micro-gyroscope. Cross coupling capacitance nulls electrical interference of the drive voltage and the low sense output. Undesirable axial mode excitation is cancelled, and a smaller number of active devices are used.

It is an object of the present invention to improve the performance of micro-machined electromechanical micro-gyroscopes.

It is another object of the present invention to reduce the costs associated with manufacturing and operating micro-machined electromechanical micro-gyroscopes.

It is yet another object of the present invention to simplify the electronic circuit that controls the micro-gyroscope.

Other objects and features of the present invention will become apparent when viewed in light of the detailed description of the preferred embodiment when taken in conjunction with the attached drawings and appended claims.

BEST MODE(S) FOR CARRYING OUT THE INVENTION

Figure 1:
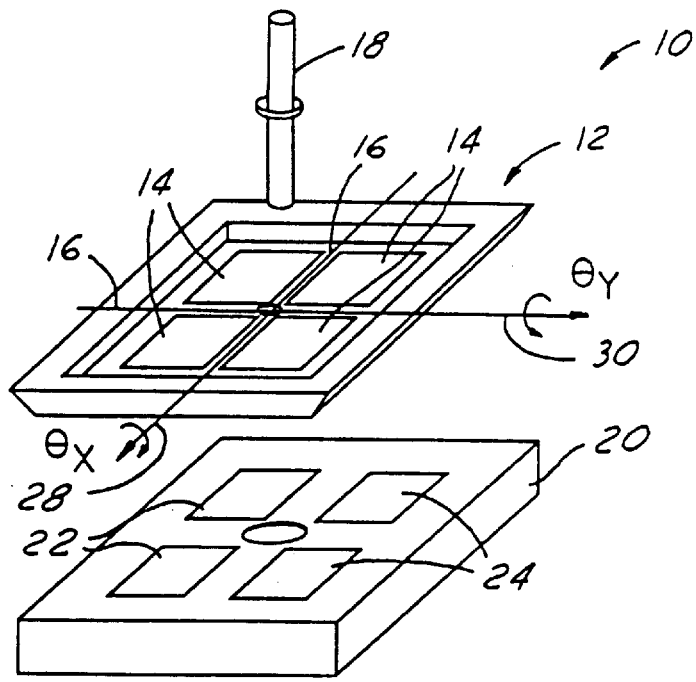
FIG. 1 is an exploded view of a prior art micro-gyroscope and electrode pattern.

Referring to FIG. 1, there is shown a prior art MEMS micro-gyroscope 10. The prior art micro-gyroscope 10 has a resonator 12 having four leaves 14 arranged in a "cloverleaf" configuration. The leaves 14 are all interconnected and grounded. Suspension springs 16 interconnect the leaves 14. A baton 18 is rigidly connected in the center of the leaves 14. This portion of the prior art micro-gyroscope 10 is the same as the micro-gyroscope of the present invention.

In the prior art micro-gyroscope 10, a base plate 20 houses two drive electrodes 22 and two sense electrodes 24. The drive and sense electrodes 22 and 24 are arranged in a pattern that coincides with the pattern of the leaves 14 of the micro-gyroscope 10.

The prior art micro-gyroscope 10 is unbalanced. Both drive electrodes 22 are on the same side of the cloverleaf pattern, and both sense electrodes 24 are on the same side as each other, opposite the drive electrodes 22. The electrical sum of the sense electrode signals is used to sense and control the amplitude of the excitation about the x-axis. The difference between the sense electrode signals produces the open loop rate signal output.

Figure 2:
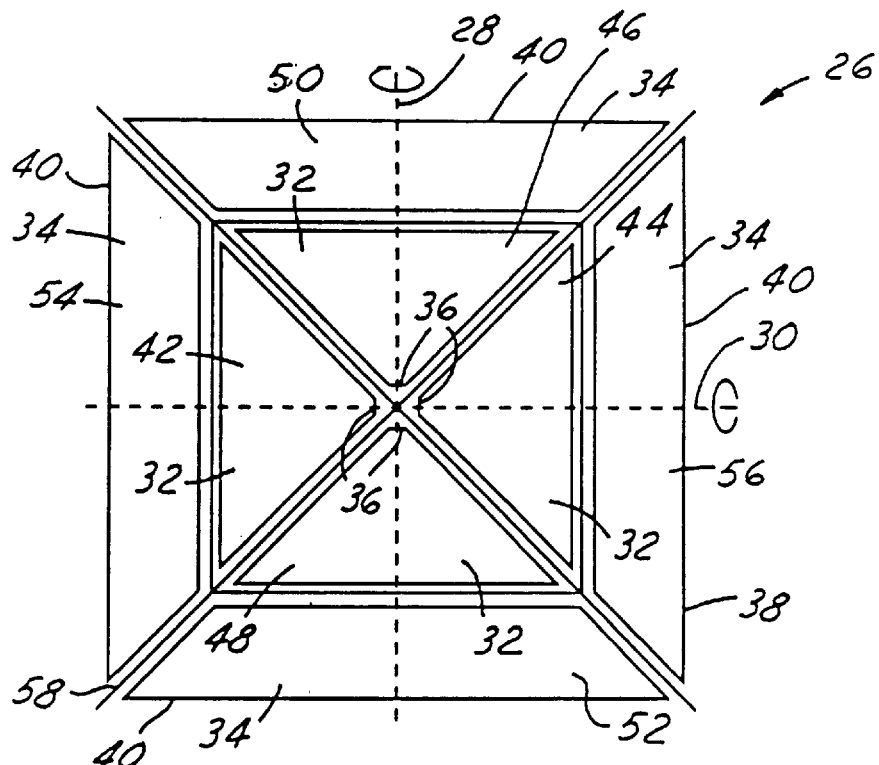
FIG. 2 is a plan view of the electrode pattern for the micro-gyroscope of the present invention.

Referring to FIG. 2 there is shown an electrode pattern 26 for the micro-gyroscope of the present invention. The structure of the resonator for the micro-gyroscope of the present invention is unchanged from the prior art and is not shown in FIG. 2. The leaves (not shown) of the micro-gyroscope have the same cloverleaf configuration as the prior art micro-gyroscope described above. However, the electrode pattern 26 varies significantly from the "cloverleaf" pattern of the prior art micro-gyroscope. The electrode pattern 26 of the present invention does not align with the leaves of the micro-gyroscope.

The electrode pattern 26 of the present invention is arranged on a vibration drive axis 28 and an output axis 30. The leaves of the micro-gyroscope (not shown) are all interconnected and grounded as in the prior art micro-gyroscope. The suspension springs (not shown) are coincident with the axes 28 and 30. The baton (not shown) on the micro-gyroscope is orthogonal to both axes 28 and 30 as in the prior art.

The electrode pattern 26 of the present invention has four drive electrodes 32 and four sense electrodes 34 that are all separate and distinct from each other. The drive electrodes 32 have a triangular configuration arranged with the apex 36 of each drive electrode 32 facing the center of the micro-gyroscope defining a square-shaped outer periphery 38.

The sense electrodes 34 surround the outer periphery 38 of the drive electrodes 32. Each of the sense electrodes 34 has a trapezoidal configuration. The base 40 of each trapezoid is centered on the drive and output axes 28 and 30 respectively. The overall electrode pattern 26 is a square shape, and each electrode is physically isolated from an adjacent electrode.

The drive electrodes 32 are balanced about the vibration and output axes 28 and 30, as are the sense electrodes 34. The drive electrodes 32 include a first vibration drive electrode 42 and a second vibration drive electrode 44 opposite each other, and a first rate drive electrode 46 and a second rate drive electrode 48, also opposite each other.

A first rate sense electrode 50 is located at the base of the first rate drive electrode 46. A second rate sense electrode 52 is located at the base of the second rate drive electrode 48. A first vibration sense electrode 54 is located at the base of the first vibration drive electrode 42. And a second vibration sense electrode 56 is located at the base of the second vibration drive electrode 44.

A shield electrode 58 is interposed between all eight electrodes. The shield electrode 58 is grounded and further enhances the separation achieved by the electrode pattern 26.

Figure 3:
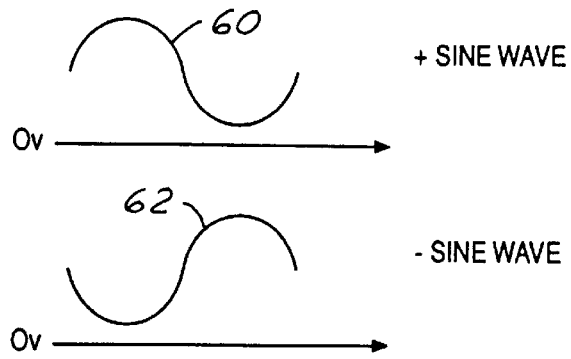
FIG. 3 is a graph of the drive waveforms for the micro-gyroscope of the present invention.

The input waveforms are shown in FIG. 3. The first vibration drive electrode 42 receives a positive sine wave 60 with a DC offset voltage. The second vibration drive electrode 44 receives a negative sine wave 62 with a DC offset voltage. The input waveforms 60 and 62 are equal in value and opposite in sign.

In operation, the electrode pattern 26 of the present invention provides a balanced push-pull circuit that avoids many of the problems associated with the prior art unbalanced electrode design. The drive and sense electrodes are symmetrical and opposing thereby minimizing unwanted capacitive coupling among electrodes. The powerful vibration excitation waveforms 60 and 62 applied to the first and second vibration drive electrodes 42 and 44 approach the most critical first and second rate sense electrodes 50 and 52 only at mutual corners. This minimizes capacitive coupling and electrical interference of the drive voltage with the sense output.

Figure 4:
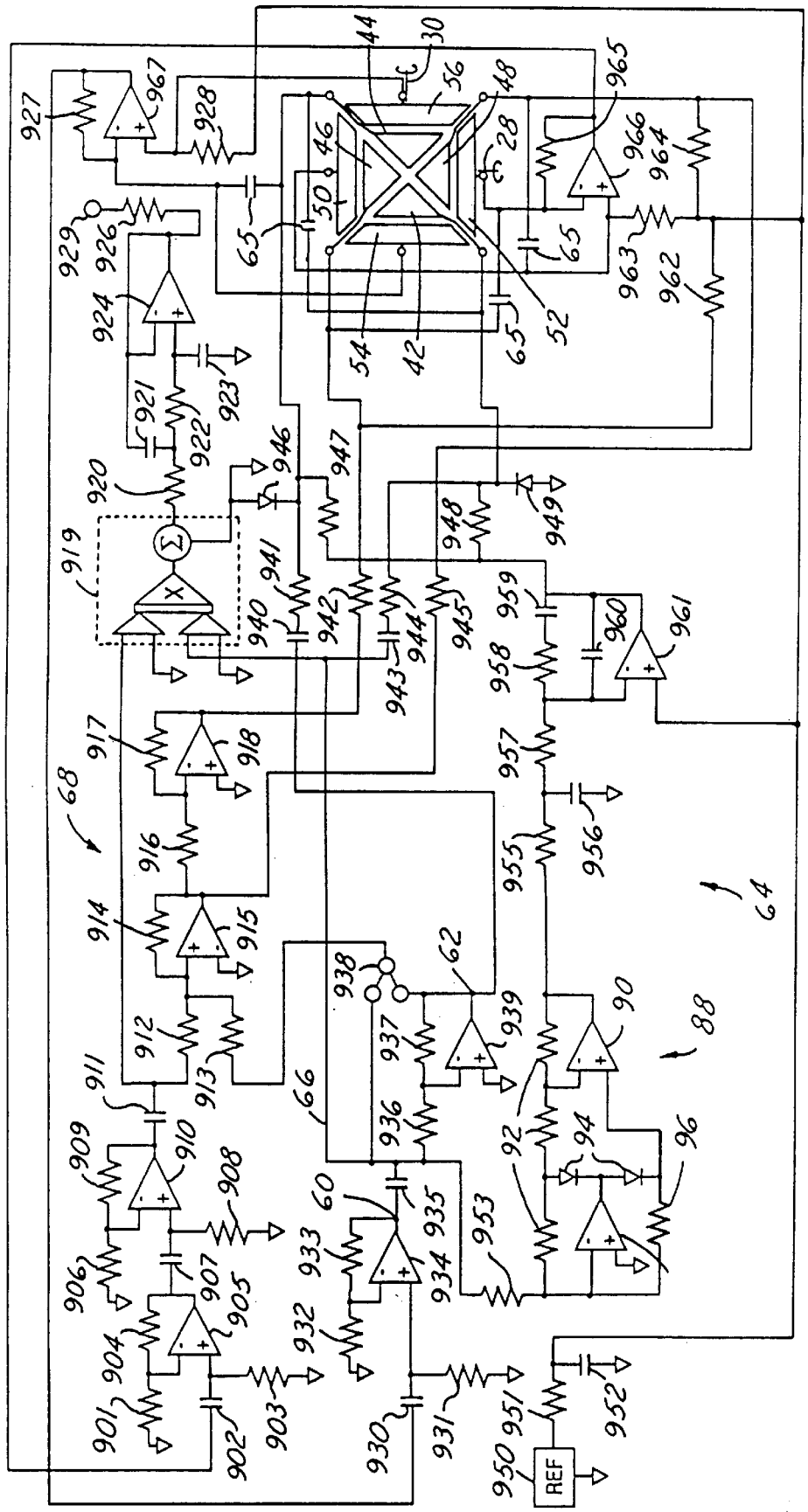
FIG. 4 is a schematic of the control circuit of the micro-gyroscope of the present invention.

The control circuit 64 for the electrode pattern 26 of the present invention is shown in FIG. 4. The first vibration drive electrode 42 receives the positive sine wave 60 and offset voltage input while the second vibration drive electrode 44 receives the negative sine 62 wave and offset voltage input. The result is that the first vibration drive electrode 42 has a strong pull and the second vibration drive electrode 44 has a weak pull. The first vibration drive electrode 42 pulls the leaves of the resonator (not shown in FIG. 4) in the direction of the first vibration drive electrode 42, tilting the micro-gyroscope (not shown).

The tilting motion results in the first and second vibration sensing electrodes 54 and 56 receiving AC signals, and thereby sensing motion. These signals are processed as feedback to a vibration drive voltage 66 that controls the first and second vibration drive electrodes 42 and 44.

As the micro-gyroscope rotates about the baton, Coriolis force causes the baton to have a tendency to move along the other axes. For optimum micro-gyroscope performance, the baton should not so move in this manner. In the present invention, the first and second rate sensing electrodes 50 and 52 sense any tendency the baton may have to move on the output axis 30. The possible movement is forced to zero by the first and second rate driving electrodes 46 and 48 having equal and opposite polarity. A negative feedback loop 68 provides the corrective, re-balance signal to the first and second rate driving electrodes 46 and 48 to offset the possible movement and hold the baton in place.

It is possible with the design of the electrode pattern 26 of the present invention for each drive signal to inadvertently couple with its accompanying sense electrode. For example, coupling may occur between the first rate drive electrode 46 and the first rate sense electrode 50. To avoid this unwanted coupling, additional capacitance 65 is introduced to the control circuit 64 to balance, or null, the inherent inter-electrode capacitance. Capacitors 65 are located between the first rate drive electrode 46 and the second rate sense electrode 52, between the second rate drive electrode 48 and the first rate sense electrode 50, between the first vibration drive electrode 42 and the second vibration sense electrode 56, and between the second vibration drive electrode 44 and the first vibration sense electrode 50. The introduction of capacitance between these electrodes compensates for the inherent inter-electrode capacitance.

The compensating capacitors 65 may be a separate electronic component having a fixed or variable value. However, in the preferred embodiment the capacitors are an inherent part of the electrode pattern 26 through parallel or overlapping traces in the fabrication of the micro-gyroscope. The inherent capacitance ensures that any change in the dielectric constant will affect both the inherent capacitance as well as the compensating capacitance.

Figure 5:
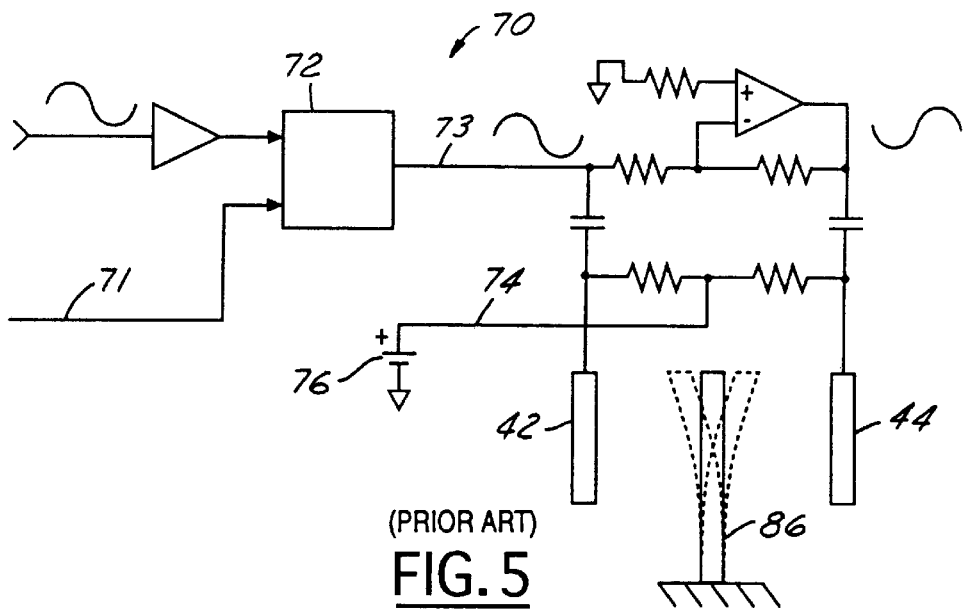
FIG. 5 is a simplified schematic of a prior art vibration amplitude control circuit for a micro-gyroscope.

The control circuit of the present invention can be simplified by eliminating the multiplier used in the prior art and using the bias voltage as the Automatic Gain Control (AGC) loop gain control voltage. A simplified schematic of a prior art control circuit 70 is shown in FIG. 5. The gain control voltage 71 is passed through an electronic analog multiplier 72 to produce the AC drive voltage 73. A bias voltage 74 is provided by a DC voltage source 76.

Figure 6:
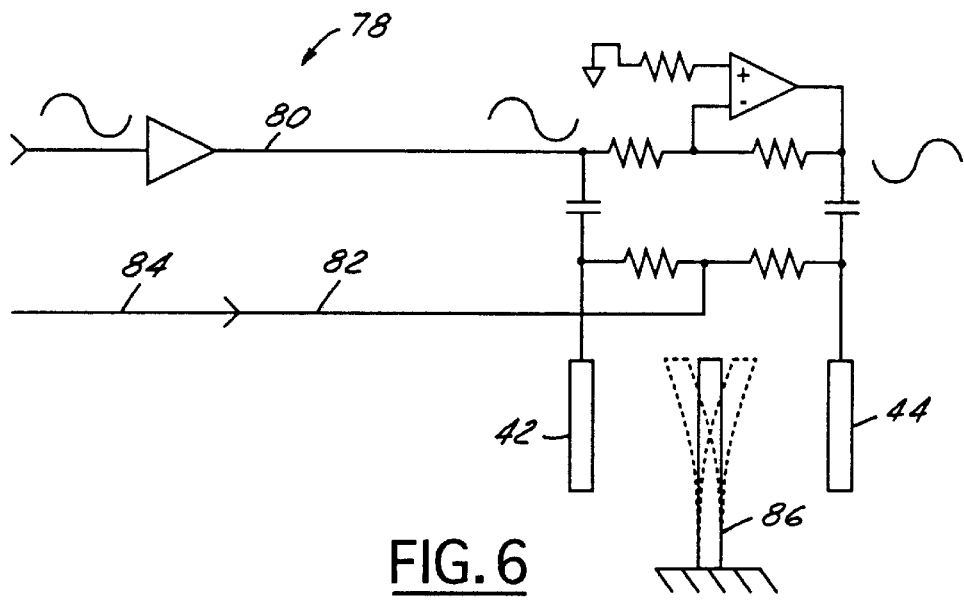
FIG. 6 is a simplified schematic of a vibration amplitude control circuit of the present invention.

The control circuit 78 of the present invention is shown in FIG. 6. The control circuit 78 exploits Coulomb's Law of Electrostatic Attraction to produce a drive force that is proportional to the product of the AC drive voltage 80 and the DC bias voltage 82 applied to the electrostatic deflection electrodes. The control circuit 78 of the present invention uses the DC bias voltage 82 as the AGC loop gain control voltage 84, thereby eliminating the need for an electronic multiplier.

Referring to FIG. 6 it is shown that the loop gain control voltage 84, formerly connected to the electronic multiplier, is connected to the DC bias points on the drive electrodes 42 and 44. In operation there is a grounded vibrating element 86 between the two symmetrical drive electrodes 22. There is a voltage on one electrode equal to $V_b+V_d$ where $V_b$ is the DC, or slowly changing, bias voltage 82 and $V_d$ is the AC drive voltage 80. The voltage on the second electrode is equal to $V_b-V_d$. The electrostatic force on the vibrating element 86 is:

$$F=K[(V_b+V_d)^2-(V_b-V_d)^2]$$

where K is constant when the vibrating element 86 is centered between the first and second vibration drive electrodes 42 and 44. The equation reduces to $F=4KV_bV_d$. The force is a constant multiplied by the product of the bias voltage 82 and the drive voltage 80.

Another element to the control circuit for the micro-gyroscope is the precise detection of oscillator amplitude for the purpose of precisely controlling the amplitude of the vibration in a micro-gyroscope. A precision full-wave rectifier, or in other words, a circuit that computes the absolute magnitude of a voltage accomplishes this. The full-wave rectifier of the present invention uses fewer parts than prior art circuits. Another advantage of the full-wave rectifier used in the control circuit of the present invention is that its gain magnitudes for positive and negative inputs are nominally equal, or balanced. The balance is easily trimmed in the circuit of the present invention to accomplish ideal balance. Ideal balance is critical to gyro performance because it cancels low frequency noise in the amplitude control loop.

Figure 7:
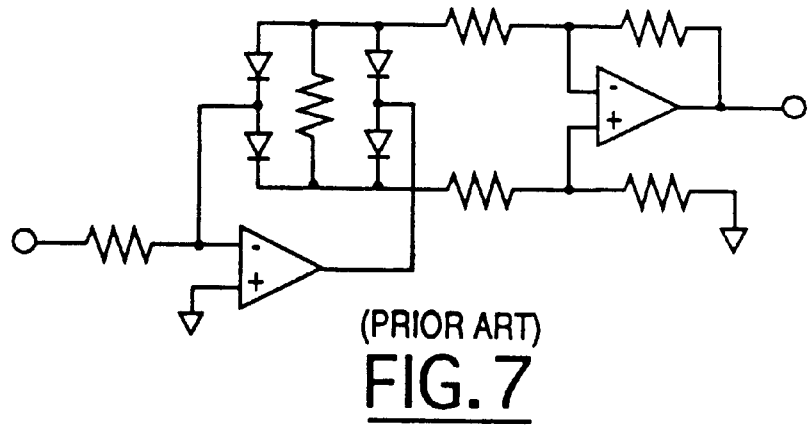
FIG. 7 is a schematic of a prior art full-wave rectifier.
Figure 8:
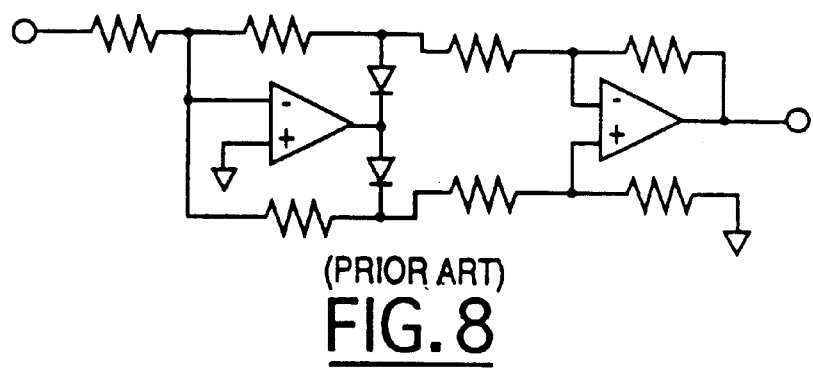
FIG. 8 is a schematic of a prior art full-wave rectifier.

FIGS. 7 and 8 show two separate examples of full-wave rectifiers that are used in the prior art. Neither of the circuits is nominally balanced. In other words, the gain magnitudes of the positive and negative inputs are not equal, which adversely affects the micro-gyroscope's performance. Additionally, the examples shown in FIGS. 7 and 8 are unnecessarily complex. Precise full-wave rectification can be accomplished using far fewer parts as shown in FIG. 9.

Figure 9:
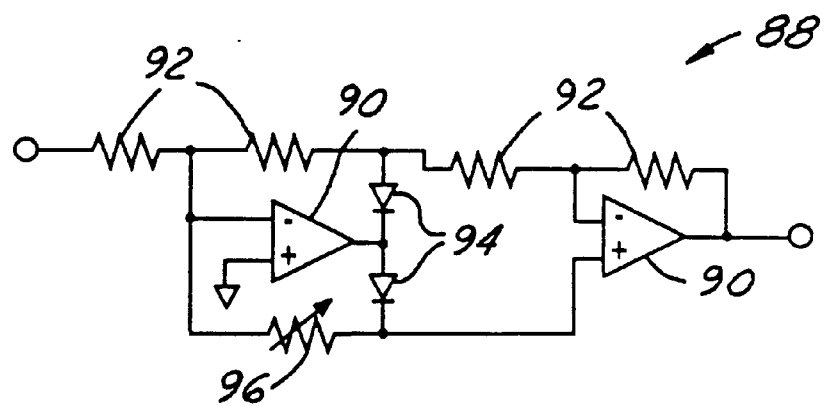
FIG. 9 is a schematic of a full-wave rectifier of the present invention.

FIG. 9 is a full-wave rectifier 88 used in the control circuit of the present invention (also shown in FIG. 4), which has considerably fewer parts than the prior art. The full-wave rectifier 88 is smaller, less expensive, and has a longer life than prior art circuits.

The full-wave rectifier 88 has two operational amplifiers 90 cascaded with each other. Resistors 92 and diodes 94 are located in the feedback loops. A variable resistor 96 is used to trim the circuit for better balance. A typical value for all of the resistors 92, including the variable resistor 96, is 50 kΩ.

The gain magnitudes for the positive and negative inputs are nominally equal making the circuit nominally balanced. The variable resistor 96 can be adjusted to achieve ideal balance.

The operation of the micro-gyroscope 10 can be described in detail while referring again to FIG. 4. In the preferred embodiment of the micro-gyroscope 10 and control electronics all of the operational amplifier shown in FIG. 4 are powered by a pair of DC voltages, at a typical value of ±15 volts. A precision reference voltage 950 is supplied to the circuit by an integrated circuit producing a typical value of +5 volts. For example, the reference voltage may be supplied by an LT1021 integrated circuit. A noise filter 951, 952 may follow the precision reference voltage 950.

Buffers 966 and 967 are provided on the output axis and the vibration drive axis respectively. The vibration drive axis buffer 967, in combination with resistors 927 and 928 produce a voltage proportional to the velocity of the cloverleaf about the vibration drive axis. Typically the output of buffer 967 is 3 volts peak-to peak when the vibration amplitude is as preferred. The output axis buffer 966, having resistors 963 and 965, produces a voltage proportional to the velocity of the cloverleaf about the output axis. The output of buffer 966 is very small due to the closed loop action of the present invention. Typical values for resistors 963, 965, 927 and 928 are 100 Megohms.

Typically, the vibration drive voltage 66 requires a voltage of 5 volts peak-to-peak but an analog multiplier 919 works best with a reference voltage of 20 volts peak-to-peak. Amplifier 934, having resistors 931, 932, 933 and capacitors 930 and 935, provides the gain to boost the 3 volts peak-to-peak signal to 20 volts peak-to-peak. Typical values for capacitor 930 is 10 nanofarads, resistors 931 and 933 are typically 200 Kohms, and resistor 932 is typically 17650 Ohms. The value of resistor 931 may be reduced to produce a phase lead to cancel any lag in the buffer 967. Any DC signal from the amplifier 934 is blocked by capacitor 935, which typically has a value of 1 Microfarad.

Inverter 939 having resistors 936 and 937 provides the opposing waveform necessary for the balanced, push-pull drive of the present invention. Typically resistors 936 and 937 are equal to each other, (about 10 Kilohms), but the ratio of these resistors may be slightly more or less than one to achieve a more perfect electrical balance. In cases of mechanical misalignment, this may not be sufficient, so some coupling of the drive signal to the sense channel is allowed through 938 for balancing purposes. The correct polarity for any misalignment is selected at 938 and the value of resistor 913 is chosen for the correct magnitude of coupled energy.

The two sinusoidal drive signals 60 and 62 have a DC value of zero. Capacitors 940 and 943 prevent these signals from affecting the DC value of the bias voltage applied to electrodes 42 and 44 by way of resistors 947 and 948. Typical values for capacitor 940 and 943 are 1 Microfarad and resistors 947 and 948 are 10 Kilohms. A pair of resistors 941 and 947 form a 4 to 1 voltage divider or attenuator that reduces the 20 volts peak-to-peak output 62 to the 5 volts peak-to-peak value typically required by the vibration drive electrode 44. Another resistor pair 944 and 948 performs the same function for electrode 42. Typical values for resistors 941 and 944 are 30 Kilohms.

The magnitude of the drive force is controlled automatically to maintain a constant amplitude at the output of amplifier 934 and hence a constant vibration amplitude. The magnitude of amplifer's 934 output is computed by the circuit 88 (described herein above with reference to FIG. 7). Resistors 92 and 96 are typically 50 Kilohom and resistor 953 is typically 63.7 Kilohm so that the average voltage at the output of circuit 88 will be 5 volts. Amplifier 961, associated resistors 955, 957, and 958 and capacitors 956, 959 and 960 subtract the output voltage of circuit 88 from the reference voltage and create the frequency shaping necessary to stabilize the automatic gain control loop. Typical values would be 54 Kilohms for resistors 955 and 957, 499 Kilohms for resistor 958, 0.1 Microfarads for capacitor 956, 0.22 Microfarads for capacitor 959 and 1 Nanofarad for capacitor 960. To take advantage of the Coulomb Multiplier, (described herein with reference to FIG. 6), the voltage output of amplifier 961 is used to bias the vibration drive electrodes 42 and 44 by way of resistors 947 and 948.

The squared term in Coulomb's Law means that a negative bias voltage will also function but this would result in positive feedback in the control loop and DC instability. Diodes 946 and 949 prevent negative voltages from being applied to the drive electrodes.

The output of buffer 966 is amplified by operational amplifiers 905 and 910 along with resistors 901 (237 Ohms), 903 (40 Kilohms), 904 (100 Kilohms), 906 (237 Ohms), 908 40 Kilohms), 909 100 Kilohms), 912 10 Kilohms), 913 (value chosen for correct magnitude of coupled energy) and 914 (10 Kilohms) and capacitors 902 (10 Nanofarads), 907 (10 Nanofarads) and 911 (1 Microfarad). Typical values are in parenthesis following the reference numeral. The value of resistor 908 can be reduced to cause a phase lead to cancel any lag introduced by the buffer 966. Summer operational amplifier 905 and resistors 901, 903 and 904 are used to compensate for mechanical misalignment. An inverter operational amplifier 918 and resistors 916 and 917 (typically 10 Kilohms each) provide the opposing waveform for the balanced push-pull drive that maintains zero motion about the output axis. The ratio of resistors 916 and 917 is nominally one but can be set slightly higher or lower to compensate for any slight electrical imbalance in the electrodes.

The scale factor of the gyroscope, measured in output volts per degree per second of rotation, is set by an attenuator consisting of resistors 945 (typically 499 Kilohms) and 964 (typically 382 Ohms) for rate drive electrode 48 and an attenuator consisting of resistors 942 (typically 499 Kilohms) and 962 (typically 382 Ohms) for rate drive electrode 46. The gain of the amplifier chain 905, 910 is set as high as practical for best performance. The maximum usable gain is typically limited by the requirement to avoid saturation at the input to the multiplier 919 by harmonics of the drive signal.

The magnitude of the component of the AC signal 68 that is in phase with the vibration drive signal 60 is the measure of the micro-gyroscopes turning rate. The signal is synchronously demodulated by the analog multiplier 919 to extract the output signal. Operational amplifier 924, resistors 920 (typically 30 Kilohms) and 922 (typically 922 Ohms) and capacitors 921 (typically 0.1 Microfarads) and 923 (typically 47 Nanofarads) provide a 2-pole, critically damped, low-pass filter on the output signal to remove modulation ripple. The function of resistor 926 (typically 220 Ohms) is to prevent any capacitive load that might be placed on the micro-gyroscope output 929 from destabilizing the operational amplifier 924.

The electrode pattern and control circuit of the micro-gyroscope of the present invention not only cost less to manufacture and operate than prior art micro-gyroscopes, but also exhibit improved performance due to simpler and more effective design. The balanced push-pull electrode pattern provides more stable and predictable micro-gyroscope performance by minimizing capacitive coupling and hence electrical interference. The mechanical separation of the vibration drive axis from the output axis diminishes the potential for rate offset and drift. The introduction of capacitance into the control circuit nulls the electrical interference of the vibration excitation voltage with the low-level output axis sense electrodes which also improves rate offset and gyro drift. The rate sense and rate drive electrodes cancel undesirable axial mode excitation.

Closing the wide-band negative feedback loop around the output axis of the micro-gyroscope linearizes the circuit to prevent unwanted harmonics that may excite mechanical vibrations in the resonator, and improve the transient response of the micro-gyroscope. Additionally, linearization removes scale factor sensitivity that is subject to variations based on the quality, or Q-factor, of the micro-gyroscope.

The vibration amplitude control circuit for the micro-gyroscope of the present invention does not require a multiplier and the full-wave rectifier is simplified. Therefore, the micro-gyroscope is lighter in weight and less expensive than prior art micro-gyroscopes. Additionally, there is no potential for drift due to temperature and radiation exposure.

While particular embodiments of the invention have been shown and described, numerous variations and alternate embodiments will occur to those skilled in the art. Accordingly, it is intended that the invention be limited only in terms of the appended claims.

What is claimed is:

1. A micro-gyroscope comprising:
   a. a base plate having a central hub having a passage therethrough;
   b. an electrode pattern in said base plate, said electrode pattern comprising:

i. a plurality of inner electrodes spaced about said central hub and defining an outer periphery;

ii. a plurality of outer electrodes spaced about and surrounding said outer periphery of said inner electrodes, said outer electrodes being in the same plane as said inner electrodes;

iii. a continuous shield electrode in between each of said inner and outer electrodes, said shield electrode being grounded;

c. a resonator spaced from and located above said base plate, said resonator comprising:

i. a frame having a central hub having a passage therethrough;

ii. four leaves in said frame, said leaves arranged symmetrically around said central hub;

iii. a baton orthogonal to said frame, said baton attached to said central hub and said four leaves, said baton extending through said passage in said frame and through said passage in said base plate; and d. a control circuit for balancing said micro-gyroscope and for controlling vibrations of said micro-gyroscope.

2. The micro-gyroscope of claim 1 wherein said electrode pattern further comprises:

four inner electrodes, each of said inner electrodes having an apex and a base, said apex of each inner electrode directed at said central hub in said base plate; and four outer electrodes surrounding said four inner electrodes, each of said outer electrodes having two parallel sides, one parallel side being shorter than the other parallel side, said shorter parallel side adjacent said base of said inner electrode such that said inner and outer electrodes define a square outer periphery.

3. The micro-gyroscope of claim 2 wherein said electrode pattern is arranged on a vibration axis and an output axis, said four inner electrodes further comprise:

a first vibration drive electrode;

a second vibration drive electrode opposite said first vibration drive electrode;

a first rate drive electrode in between said first and second vibration drive electrodes; and a second rate drive electrode opposite said first rate drive electrode; and said four outer electrodes further comprise:

a first vibration sense electrode adjacent said base of said first vibration drive electrode;

a second vibration sense electrode adjacent said base of said second vibration drive electrode;

a first rate sense electrode adjacent said base of said first rate drive electrode; and a second rate sense electrode adjacent said base of said second rate drive electrode;

each of said inner and outer electrodes being symmetrical about said hub of said base plate.

4. The micro-gyroscope as claimed in claim 3 wherein said control circuit further comprises a vibration drive voltage applied to said first vibration drive electrode and an equal and opposite vibration drive voltage applied to said second vibration drive electrode for causing movement of said micro-gyroscope, thereby sending AC signals to said first and second vibration sensing electrodes, said first and second vibration sensing electrodes producing signals processed as feedback to said vibration drive voltages.

5. The micro-gyroscope as claimed in claim 3 further comprising a negative feedback loop for providing a corrective signal to said first and second rate driving electrodes wherein said first and second rate sensing electrodes sense movement of said baton and send a signal to said negative feedback loop, said negative feedback loop processes said signal and provides equal and opposite signals to said rate driving electrodes for offsetting movement of said baton.

6. The micro-gyroscope as claimed in claim 3 further comprising:

means for producing a capacitance between said first rate drive electrode and said second rate sense electrode;

means for producing a capacitance between said second rate drive electrode and said first rate sense electrode;

means for producing a capacitance between said first vibration drive electrode and said second vibration sense electrode; and means for producing a capacitance between said second vibration drive electrode and said first vibration sense electrode.

7. The micro-gyroscope as claimed in claim 6 wherein said capacitance is etched into said electrode pattern.

8. A micro-gyroscope as claimed in claim 6 wherein said control circuit further comprises:

a precision reference voltage for providing a bias voltage to said micro-gyroscope;

a vibration axis buffer coupled to said vibration axis;

an output axis buffer coupled to said output axis;

an amplifier for providing a waveform for driving said micro-gyroscope;

an inverter for providing an opposing waveform for balanced, push-pull drive of said micro-gyroscope;

a coupler between said amplifier and said inverter for coupling said driving waveform and said opposing waveform to achieve balance said micro-gyroscope;

a capacitor at an output of said amplifier and a capacitor at an output of said inverter, said capacitors for preventing DC signal interference with said bias voltage;

a voltage divider for providing optimum voltage to said vibration drive electrodes;

a full-wave rectifier for computing an output of said amplifier;

a circuit following said full-wave rectifier for providing a difference between said output of said amplifier and said bias voltage to maintain a constant amplitude at said output of said amplifier;

a closed loop having an output, said closed loop about said output axis comprising:

summer for compensating for mechanical misalignment of said micro-gyroscope;

an inverter for providing an opposing waveform to maintain zero motion of said micro-gyroscope about said output axis;

an attenuator coupled to said rate drive electrodes for setting a scale factor for said micro-gyro-scope;

an analog multiplier for synchronously demodulating said output of said closed loop; and a filter on said demodulated output for providing an output of said micro-gyroscope.

9. The micro-gyroscope as claimed in claim 1 wherein said control circuit further comprises DC bias points at said plurality of electrodes and a loop gain control voltage connected to said DC bias points, whereby an electrostatic force on said micro-gyroscope is linearized as a product of said bias voltage and a drive voltage.

10. The micro-gyroscope as claimed in claim 1 wherein said control circuit further comprises a full-wave rectifier comprising:

a first operational amplifier;

a second operational amplifier cascaded with said first operational amplifier, said first and second operational amplifiers having gain magnitudes for positive and negative inputs that are nominally equal; and a variable resistor across said first operational amplifier for trimming said full-wave rectifier to achieve ideal balance.

11. A control circuit for a micro-gyroscope having a plurality of drive electrodes, a plurality of sense electrodes, and a vibrating element centered between said electrodes, said control circuit comprising:

means for producing a vibration drive voltage applied to one of said plurality of electrodes and an equal and opposite vibration drive voltage applied to another of said plurality of electrodes causing movement of said micro-gyroscope and sensed by at least two of said sense electrodes whereby said sense electrodes produce a signal;

a closed feedback loop that processes said signal to control said vibration drive voltage;

a negative feedback loop for providing a corrective signal to at least two of said driving electrodes wherein at least two of said sensing electrodes sense undesirable movements of said micro-gyroscope and produce a signal, said signal being processed by said negative feedback loop to provide equal and opposite signals to said at least two driving electrodes for offsetting said undesirable movements; and means for producing a capacitance between opposing drive and sense electrodes in order to avoid capacitive coupling between adjacent drive and sense electrodes.

12. The control circuit as claimed in claim 11 wherein said capacitance is etched into said micro-gyroscope.

13. The control circuit as claimed in claim 11 further comprising DC bias points at said plurality of electrodes and a loop gain control voltage connected to said DC bias points, whereby an electrostatic force on said micro-gyroscope is linearized as a constant multiplied by a product of said bias voltage and a drive voltage.

14. The control circuit as claimed in claim 11 further comprising a full-wave rectifier comprising:

a first operational amplifier;

a second operational amplifier cascaded with said first operational amplifier, said first and second operational amplifiers having nominally equal gain magnitudes for positive and negative inputs; and a variable resistor across said first operational amplifier for trimming said full-wave rectifier to achieve ideal balance.

15. An electrode pattern for a micro-gyroscope having four symmetrical leaves, said electrode pattern comprising:

four inner electrodes arranged such that they define an outer periphery; and four outer electrodes arranged about said outer periphery of said four inner electrodes.

16. The electrode pattern as claimed in claim 15 wherein said four inner electrodes further comprise:

two opposing vibration drive electrodes and two opposing rate drive electrodes;

said four outer electrodes further comprise two opposing vibration sense electrodes and two opposing rate sense electrodes such that said vibration sense electrodes are adjacent respective vibration drive electrodes and said rate sense electrodes are adjacent respective rate drive electrodes.

17. The electrode pattern as claimed in claim 16 wherein each of said inner electrodes further comprise a triangular shaped electrode arranged such that said outer periphery has a square shape; and each of said outer electrodes further comprise a trapezoidal shaped electrode arranged about said outer periphery of said inner electrodes and defining a square shaped outer periphery.

* * * * *